United States Patent
Comparan et al.

(10) Patent No.: US 7,917,703 B2
(45) Date of Patent: Mar. 29, 2011

(54) NETWORK ON CHIP THAT MAINTAINS CACHE COHERENCY WITH INVALIDATE COMMANDS

(75) Inventors: Miguel Comparan, Rochester, MN (US); Russell D. Hoover, Rochester, MN (US); Jamie R. Kuesel, Rochester, MN (US); Eric O. Mejdrich, Rochester, MN (US); Alfred T. Watson, III, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 11/955,553

(22) Filed: Dec. 13, 2007

(65) Prior Publication Data

US 2009/0157976 A1    Jun. 18, 2009

(51) Int. Cl.
   *G06F 12/08* (2006.01)
(52) U.S. Cl. .................. 711/141; 712/10; 370/356
(58) Field of Classification Search .................. None
   See application file for complete search history.

(56) References Cited

U.S. PATENT DOCUMENTS

| | | | |
|---|---|---|---|
| 4,813,037 A | 3/1989 | Debuysscher et al. | |
| 5,761,516 A | 6/1998 | Rostoker et al. | |
| 5,884,060 A | 3/1999 | Vegesna et al. | |
| 6,085,315 A | 7/2000 | Fleck et al. | |
| 6,145,072 A | 11/2000 | Shams et al. | |
| 6,151,668 A | 11/2000 | Pechanek et al. | |
| 6,567,895 B2 | 5/2003 | Scales | |
| 6,668,308 B2 | 12/2003 | Barroso et al. | |
| 6,725,317 B1 | 4/2004 | Bouchier et al. | |
| 6,891,828 B2 * | 5/2005 | Ngai | 370/357 |
| 6,950,438 B1 * | 9/2005 | Owen et al. | 370/409 |
| 7,162,560 B2 | 1/2007 | Taylor et al. | |
| 7,394,288 B1 | 7/2008 | Agarwal | |
| 7,398,374 B2 | 7/2008 | DeLano | |
| 7,464,197 B2 | 12/2008 | Ganapathy et al. | |
| 7,493,474 B1 | 2/2009 | Pechanek et al. | |
| 7,500,060 B1 | 3/2009 | Anderson et al. | |
| 7,502,378 B2 | 3/2009 | Lajolo et al. | |
| 7,521,961 B1 | 4/2009 | Anderson et al. | |
| 7,546,444 B1 | 6/2009 | Wolrich et al. | |
| 7,568,064 B2 | 7/2009 | Reblewski et al. | |
| 2002/0099833 A1 * | 7/2002 | Steely et al. | 709/228 |
| 2002/0178337 A1 | 11/2002 | Wilson et al. | |

(Continued)

OTHER PUBLICATIONS

"The Power of Priority: NoC based Distributed Cache Coherency" by Bolotin et al., published May 21, 2007 by IEEE, ISBN: 0-7695-2773-6/07, pp. 117-126).*

(Continued)

*Primary Examiner* — Kaushikkumar Patel
(74) *Attorney, Agent, or Firm* — Biggers & Ohanian LLP

(57) ABSTRACT

A network on chip ('NOC') comprising integrated processor ('IP') blocks, routers, memory communications controllers, and network interface controller, each IP block coupled to a router through a memory communications controller and a network interface controller, the NOC also including a port on a router of the network through which is received an invalidate command, the invalidate command including an identification of a cache line, the invalidate command representing an instruction to invalidate the cache line, the router configured to send the invalidate command to an IP block served by the router; the router further configured to send the invalidate command horizontally and vertically to neighboring routers if the port is a vertical port; and the router further configured to send the invalidate command only horizontally to neighboring routers if the port is a horizontal port.

16 Claims, 5 Drawing Sheets

U.S. PATENT DOCUMENTS

| | | | | |
|---|---|---|---|---|
| 2003/0065890 | A1* | 4/2003 | Lyon | 711/141 |
| 2004/0088487 | A1 | 5/2004 | Barroso et al. | |
| 2004/0260906 | A1* | 12/2004 | Landin et al. | 711/203 |
| 2005/0166205 | A1 | 7/2005 | Oskin et al. | |
| 2005/0238035 | A1 | 10/2005 | Riley | |
| 2006/0209846 | A1* | 9/2006 | Clermidy et al. | 370/400 |
| 2007/0055826 | A1* | 3/2007 | Morton et al. | 711/141 |
| 2007/0076739 | A1* | 4/2007 | Manjeshwar et al. | 370/432 |
| 2008/0134191 | A1 | 6/2008 | Warrier et al. | |
| 2008/0186998 | A1 | 8/2008 | Rijpkerna | |
| 2009/0083263 | A1 | 3/2009 | Felch et al. | |
| 2009/0282222 | A1 | 11/2009 | Hoover et al. | |

OTHER PUBLICATIONS

"A Network on Chip Architecture and Design Methodology" by Kumar et al. Published 2002, ISBN 0-7695-1486-3/02 by IEEE, pp. 8.*

Office Action Dated Jan. 29, 2010 in U.S. Appl. No. 11/945,396.
Final Office Action Dated Jan. 15, 2010 in U.S. Appl. No. 12/031,733.
U.S. Appl. No. 12/117,897, filed May 9, 2008, Hoover, et al.
U.S. Appl. No. 12/031,733, filed Feb. 15, 2008, Hoover, et al.
U.S. Appl. No. 12/108,846, filed Apr. 24, 2008, Kuesel, et al.
U.S. Appl. No. 12/108,770, filed Apr. 24, 2008, Mejdrich et al.
U.S. Appl. No. 12/029,647, filed Feb. 12, 2008, Hoover et al.
U.S. Appl. No. 12/118,017, filed May 9, 2008, Comparan, et al.
U.S. Appl. No. 12/118,059, filed May 9, 2008, Mejdrich, et al.
U.S. Appl. No. 12/117,875, filed May 9, 2008, Hoover, et al.
U.S. Appl. No. 12/121,222, filed May 15, 2008, Kriegel, et al.
U.S. Appl. No. 11/936,873, filed Nov. 8, 2007, Hoover, et al.
U.S. Appl. No. 12/134,364, filed Jun. 9, 2008, Hoover, et al.
U.S. Appl. No. 11/937,579, filed Nov. 9, 2007, Mejdrich, et al.
U.S. Appl. No. 12/102,033, filed Apr. 14, 2008, Heil, et al.
U.S. Appl. No. 12/118,272, filed May 9, 2008, Kuesel, et al.
U.S. Appl. No. 12/118,039, filed May 9, 2008, Hoover, et al.
U.S. Appl. No. 11/945,396, filed Nov. 27, 2007, Hoover, et al.
U.S. Appl. No. 12/015,975, filed Jan. 17, 2008, Comparan, et al.
U.S. Appl. No. 12/117,906, filed May 9, 2008, Hoover, et al.
U.S. Appl. No. 12/233,180, filed Sep. 18, 2008, Hoover, et al.
U.S. Appl. No. 12/113,286, filed May 1, 2008, Heil, et al.
U.S. Appl. No. 11/955,553, filed Dec. 13, 2007, Comparan, et al.
U.S. Appl. No. 12/031,738, filed Feb. 15, 2008, Hoover, et al.
U.S. Appl. No. 11/972,753, filed Jan. 11, 2008, Mejdrich, et al.
U.S. Appl. No. 12/060,559, filed Apr. 1, 2008, Comparan, et al.
U.S. Appl. No. 11/926,212, filed Oct. 29, 2007, Hoover, et al.
U.S. Appl. No. 12/118,298, filed May 9, 2008, Heil, et al.
U.S. Appl. No. 12/118,315, filed May 9, 2008, Mejdrich, et al.
U.S. Appl. No. 11/938,376, filed Nov. 12, 2007, Mejdrich, et al.
U.S. Appl. No. 12/121,168, filed May 15, 2008, Hoover, et al.
Office Action Dated Jul. 20, 2009 in U.S. Appl. No. 12/031,733.
Kuskin, et al.; The Stanford Flash Multiprocessor; Jun. 6, 1996; Stanford University.
David Taylor, et al. "System on Chip Packet Processor for an Experimental Network Service Platform". 2003.
Office Action Dated Mar. 30, 2010 in U.S. Appl. No. 11/926,212.
Final Office Action Dated May 19, 2010 in U.S. Appl. No. 11/945,396.
Intel, E8870 Chipset, Intel, Jun. 2002, pp. 1-10.
Office Action Dated Apr. 2, 2010 in U.S. Appl. No. 11/955,553.
Office Action Dated Mar. 24, 2010 in U.S. Appl. No. 12/031,733.
Walter, et al., "BENoC: A Bus-Enhanced Network on-Chip". Dec. 2007, Technion, Israel Institute of Technology, Haifa, Israel.
Office Action Dated Jun. 8, 2010 in U.S. Appl. No. 12/118,298.
Office Action Dated May 26, 2010 in U.S. Appl. No. 12/117,875.

* cited by examiner

US 7,917,703 B2

NETWORK ON CHIP THAT MAINTAINS CACHE COHERENCY WITH INVALIDATE COMMANDS

BACKGROUND OF THE INVENTION

1. Field of the Invention

The field of the invention is data processing, or, more specifically apparatus and methods for data processing with a network on chip ('NOC').

2. Description of Related Art

There are two widely used paradigms of data processing; multiple instructions, multiple data ('MIMD') and single instruction, multiple data ('SIMD'). In MIMD processing, a computer program is typically characterized as one or more threads of execution operating more or less independently, each requiring fast random access to large quantities of shared memory. MIMD is a data processing paradigm optimized for the particular classes of programs that fit it, including, for example, word processors, spreadsheets, database managers, many forms of telecommunications such as browsers, for example, and so on.

SIMD is characterized by a single program running simultaneously in parallel on many processors, each instance of the program operating in the same way but on separate items of data. SIMD is a data processing paradigm that is optimized for the particular classes of applications that fit it, including, for example, many forms of digital signal processing, vector processing, and so on.

There is another class of applications, however, including many real-world simulation programs, for example, for which neither pure SIMD nor pure MIMD data processing is optimized. That class of applications includes applications that benefit from parallel processing and also require fast random access to shared memory. For that class of programs, a pure MIMD system will not provide a high degree of parallelism and a pure SIMD system will not provide fast random access to main memory stores.

SUMMARY OF THE INVENTION

A network on chip ('NOC'), and methods of operation of a NOC, that maintains cache coherency with invalidate commands, the NOC comprising integrated processor ('IP') blocks, routers, memory communications controllers, and network interface controller, each IP block adapted to a router through a memory communications controller and a network interface controller, each memory communications controller controlling communication between an IP block and memory, and each network interface controller controlling inter-IP block communications through routers, the NOC also including a port on a router of the network through which is received an invalidate command, the invalidate command including an identification of a cache line, the invalidate command representing an instruction to invalidate the cache line, the router configured to send the invalidate command to an IP block served by the router; the router further configured to send the invalidate command horizontally and vertically to neighboring routers if the port is a vertical port; and the router further configured to send the invalidate command only horizontally to neighboring routers if the port is a horizontal port.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
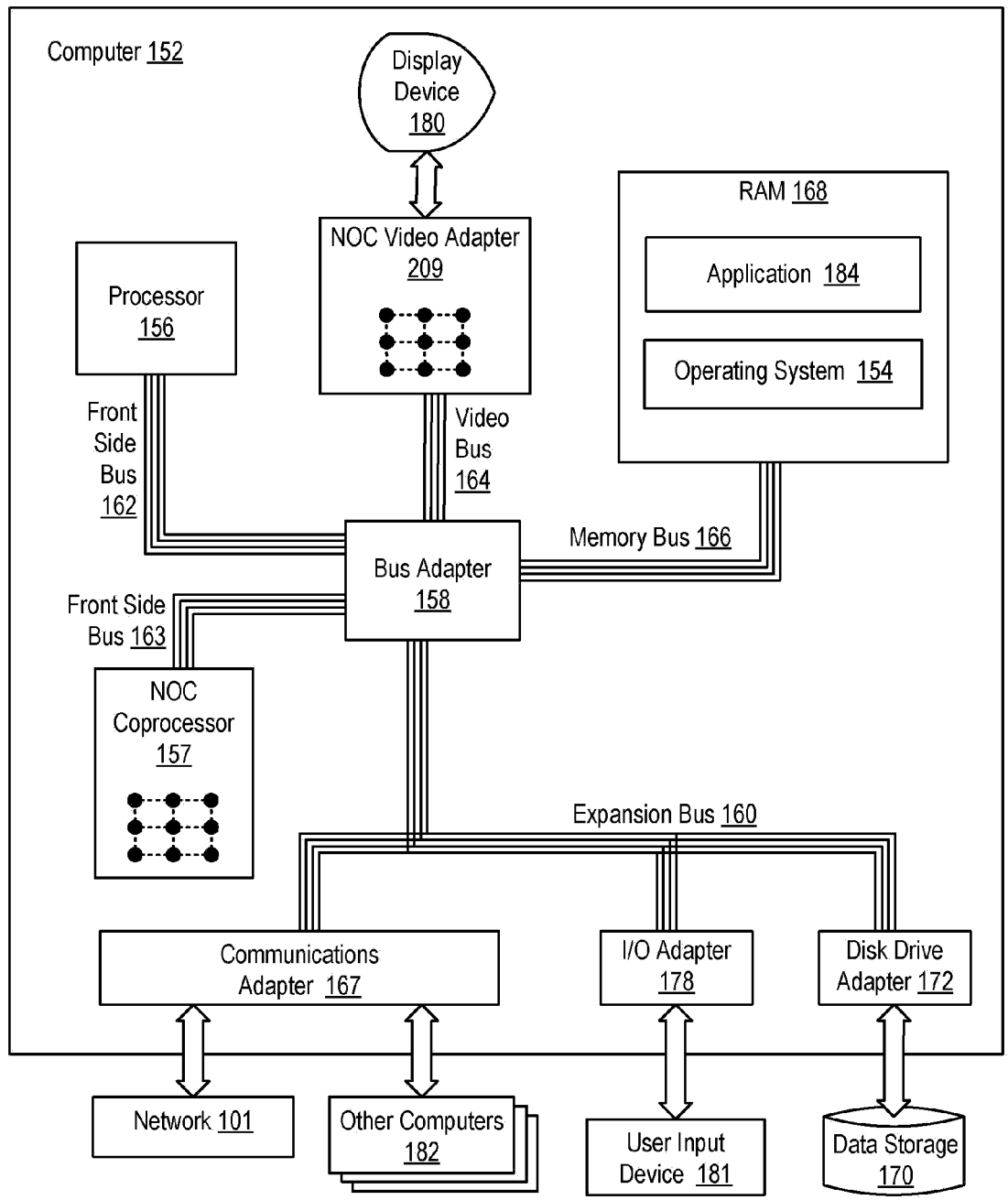
FIG. 1 sets forth a block diagram of automated computing machinery comprising an exemplary computer useful in data processing with a NOC according to embodiments of the present invention.

Exemplary apparatus and methods for data processing with a NOC in accordance with the present invention are described with reference to the accompanying drawings, beginning with FIG. 1. FIG. 1 sets forth a block diagram of automated computing machinery comprising an exemplary computer (152) useful in data processing with a NOC according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an application program (184), a module of user-level computer program instructions for carrying out particular data processing tasks such as, for example, word processing, spreadsheets, database operations, video gaming, stock market simulations, atomic quantum process simulations, or other user-level applications. Also stored in RAM (168) is an operating system (154). Operating systems useful data processing with a NOC according to embodiments of the present invention include UNIX™, Linux™, Microsoft XP™, AIX™, IBM's i5/OS™, and others as will occur to those of skill in the art. The operating system (154) and the application (184) in the example of FIG. 1 are shown in RAM (168), but many components of such software typically are stored in non-volatile memory also, such as, for example, on a disk drive (170).

The example computer (152) includes two example NOCs according to embodiments of the present invention: a video adapter (209) and a coprocessor (157). The video adapter (209) is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example NOC coprocessor (157) is connected to processor (156) through bus adapter (158), and front side buses (162 and 163), which is also a high speed bus. The NOC coprocessor of FIG. 1 is optimized to accelerate particular data processing tasks at the behest of the main processor (156).

The example NOC video adapter (209) and NOC coprocessor (157) of FIG. 1 each include a NOC according to embodiments of the present invention, including integrated processor ('IP') blocks, routers, memory communications controllers, and network interface controllers, each IP block adapted to a router through a memory communications controller and a network interface controller, each memory communications controller controlling communication between an IP block and memory, and each network interface controller controlling inter-IP block communications through routers. The NOCs in the NOC video adapter (209) and NOC coprocessor (157) of FIG. 1 each include at least one port on a router of the each NOC through which is received an invalidate command, where the invalidate command includes an identification of a cache line, and the invalidate command represents an instruction to invalidate the cache line. A router configured to receive such an invalidate command is also configured to send the invalidate command to an IP block served by the router, that is, to the IP block to which the router is adapted by a memory communications controller and a network interface controller. Such a router is also configured to send the invalidate command horizontally and vertically to neighboring routers if the port through which the invalidate command is received is a vertical port and to send the invalidate command only horizontally to neighboring routers if the port through which the invalidate command is received is a horizontal port. The NOC video adapter and the NOC coprocessor are optimized for programs that use parallel processing and also require fast random access to shared memory. Additional explanatory details of exemplary NOC structures and operations are described below with reference to FIGS. 2-5.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for data processing with a NOC according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for data processing with a NOC according to embodiments of the present invention include modems for wired dial-up communications, Ethernet (IEEE 802.3) adapters for wired data communications network communications, and 802.11 adapters for wireless data communications network communications.

Figure 2:
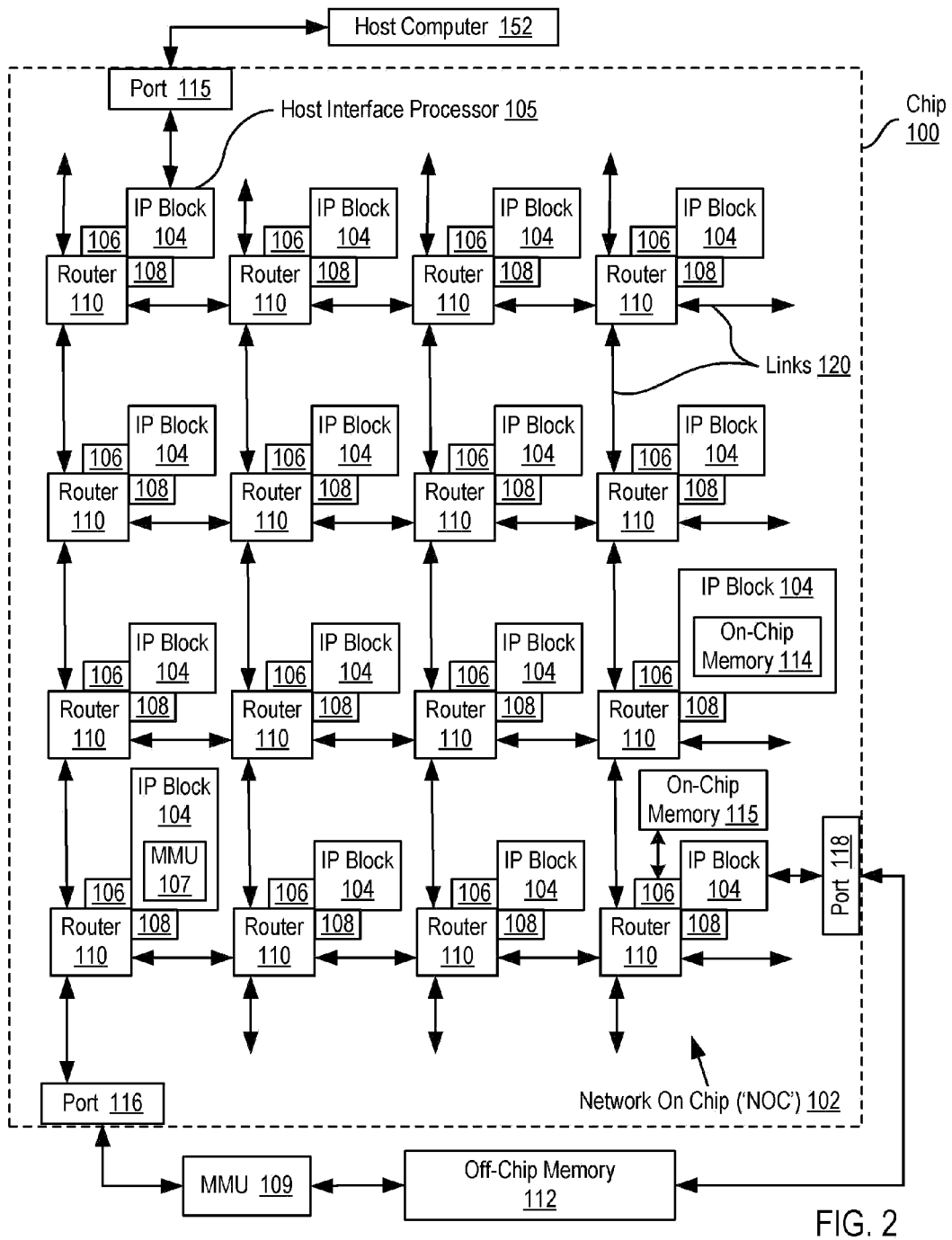
FIG. 2 sets forth a functional block diagram of an example NOC according to embodiments of the present invention.

For further explanation, FIG. 2 sets forth a functional block diagram of an example NOC (102) according to embodiments of the present invention. The NOC in the example of FIG. 1 is implemented on a 'chip' (100), that is, on an integrated circuit. The NOC (102) of FIG. 2 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110).

In the NOC (102) of FIG. 2, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs according to embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well.

Each IP block (104) in the example of FIG. 2 is adapted to a router (110) through a memory communications controller (106). Each memory communication controller is an aggregation of synchronous and asynchronous logic circuitry adapted to provide data communications between an IP block and memory. Examples of such communications between IP blocks and memory include memory load instructions and memory store instructions. The memory communications controllers (106) are described in more detail below with reference to FIG. 3.

Each IP block (104) in the example of FIG. 2 is also adapted to a router (110) through a network interface controller (108). Each network interface controller (108) controls communications through routers (110) between IP blocks (104). Examples of communications between IP blocks include messages carrying data and instructions for processing the data among IP blocks in parallel applications and in pipelined applications. The network interface controllers (108) are described in more detail below with reference to FIG. 3.

Each IP block (104) in the example of FIG. 2 is adapted to a router (110). The routers (110) and links (120) among the routers implement the network operations of the NOC. The links (120) are packets structures implemented on physical, parallel wire buses connecting all the routers. That is, each link is implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wise, 512 wires. In addition, each link is bi-directional, so that if the link packet structure includes 64 bytes, the wire bus actually contains 1024 wires between each router and each of its neighbors in the network. A message can includes more than one packet, but each packet fits precisely onto the width of the wire bus. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller (106) in the example of FIG. 2 controls communications between an IP block and memory. Memory can include off-chip main RAM (112), memory (115) connected directly to an IP block through a memory communications controller (106), on-chip memory enabled as an IP block (114), and on-chip caches. In the NOC of FIG. 2, either of the on-chip memories (114, 115), for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory (114) on an IP block can be addressed from that IP block or from any other IP block in the NOC. Memory (115) attached directly to a memory communication controller can be addressed by the IP block that is adapted to the network by that memory communication controller—and can also be addressed from any other IP block anywhere in the NOC.

The example NOC includes two memory management units ('MMUs') (107, 109), illustrating two alternative memory architectures for NOCs according to embodiments of the present invention. MMU (107) is implemented with an IP block, allowing a processor within the IP block to operate in virtual memory while allowing the entire remaining architecture of the NOC to operate in a physical memory address space. The MMU (109) is implemented off-chip, connected to the NOC through a data communications port (116). The port (116) includes the pins and other interconnections required to conduct signals between the NOC and the MMU, as well as sufficient intelligence to convert message packets from the NOC packet format to the bus format required by the external MMU (109). The external location of the MMU means that all processors in all IP blocks of the NOC can operate in virtual memory address space, with all conversions to physical addresses of the off-chip memory handled by the off-chip MMU (109).

In addition to the two memory architectures illustrated by use of the MMUs (107, 109), data communications port (118) illustrates a third memory architecture useful in NOCs according to embodiments of the present invention. Port (118) provides a direct connection between an IP block (104) of the NOC (102) and off-chip memory (112). With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port (118). The port (118) includes the pins and other interconnections required to conduct signals between the NOC and the off-chip memory (112), as well as sufficient intelligence to convert message packets from the NOC packet format to the bus format required by the off-chip memory (112).

In the example of FIG. 2, one of the IP blocks is designated a host interface processor (105). A host interface processor (105) provides an interface between the NOC and a host computer (152) in which the NOC may be installed and also provides data processing services to the other IP blocks on the NOC, including, for example, receiving and dispatching among the IP blocks of the NOC data processing requests from the host computer. A NOC may, for example, implement a video graphics adapter (209) or a coprocessor (157) on a larger computer (152) as described above with reference to FIG. 1. In the example of FIG. 2, the host interface processor (105) is connected to the larger host computer through a data communications port (115). The port (115) includes the pins and other interconnections required to conduct signals between the NOC and the host computer, as well as sufficient intelligence to convert message packets from the NOC to the bus format required by the host computer (152). In the example of the NOC coprocessor in the computer of FIG. 1, such a port would provide data communications format translation between the link structure of the NOC coprocessor (157) and the protocol required for the front side bus (163) between the NOC coprocessor (157) and the bus adapter (158).

The NOC (102) in the example of FIG. 2 includes at least one port on a router (110) of the NOC through which is received an invalidate command, where the invalidate command includes an identification of a cache line, and the invalidate command represents an instruction to invalidate the cache line. A router (110) configured to receive such an invalidate command is also configured to send the invalidate command to an IP block (104) served by the router (110), that is, to the IP block (104) to which the router (110) is adapted by a memory communications controller (106) and a network interface controller (108). Such a router (110) is also configured to send the invalidate command horizontally and vertically to neighboring routers if the port through which the invalidate command is received is a vertical port and to send the invalidate command only horizontally to neighboring routers if the port through which the invalidate command is received is a horizontal port.

Figure 3:
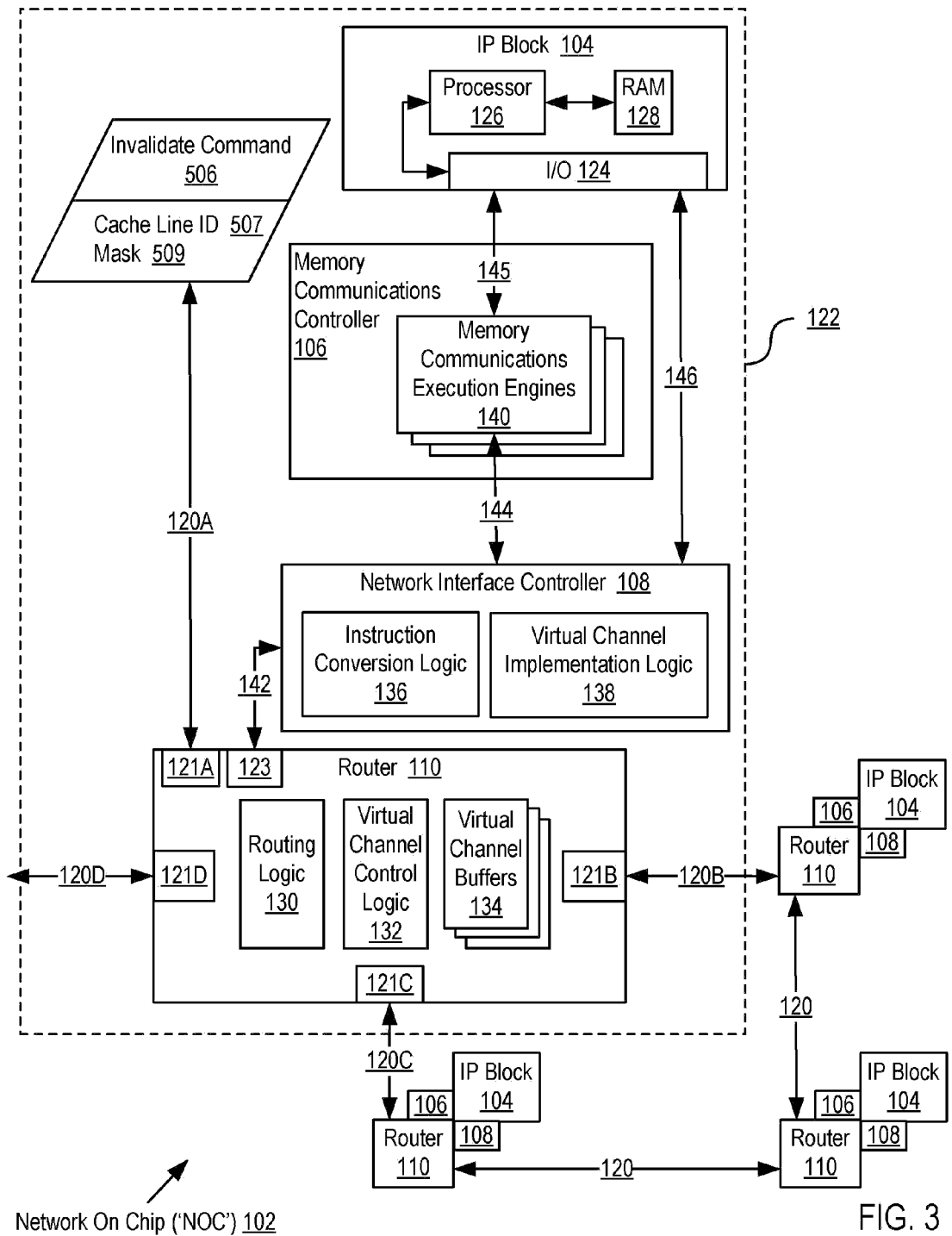
FIG. 3 sets forth a functional block diagram of a further example NOC according to embodiments of the present invention.

For further explanation, FIG. 3 sets forth a functional block diagram of a further example NOC according to embodiments of the present invention. The example NOC of FIG. 3 is similar to the example NOC of FIG. 2 in that the example NOC of FIG. 3 is implemented on a chip (100 on FIG. 2), and the NOC (102) of FIG. 3 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110). In the example of FIG. 3, one set (122) of an IP block (104) adapted to a router (110) through a memory communications controller (106) and network interface controller (108) is expanded to aid a more detailed explanation of their structure and operations. All the IP blocks, memory communications controllers, network interface controllers, and routers in the example of FIG. 3 are configured in the same manner as the expanded set (122).

In the example of FIG. 3, each IP block (104) includes a computer processor (126) and I/O functionality (124). In this example, computer memory is represented by a segment of random access memory ('RAM') (128) in each IP block (104). The memory, as described above with reference to the example of FIG. 2, can occupy segments of a physical address space whose contents on each IP block are addressable and accessible from any IP block in the NOC. The processors (126), I/O capabilities (124), and memory (128) on each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In the NOC (102) of FIG. 3, each memory communications controller (106) includes a plurality of memory communications execution engines (140). Each memory communications execution engine (140) is enabled to execute memory communications instructions from an IP block (104), including bidirectional memory communications instruction flow (142, 144, 145) between the network and the IP block (104). The memory communications instructions executed by the memory communications controller may originate, not only from the IP block adapted to a router through a particular memory communications controller, but also from any IP block (104) anywhere in the NOC (102). That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine (140) is enabled to execute a complete memory communications instruction separately and in parallel with other memory communications execution engines. The memory communications execution engines implement a scalable memory transaction processor optimized for concurrent throughput of memory communications instructions. The memory communications controller (106) supports multiple memory communications execution engines (140) all of which run concurrently for simultaneous execution of multiple memory communications instructions. A new memory communications instruction is allocated by the memory communications controller (106) to a memory communications engine (140) and the memory communications execution engines (140) can accept multiple response events simultaneously. In this example, all of the memory communications execution engines (140) are identical. Scaling the number of memory communications instructions that can be handled simultaneously by a memory communications controller (106), therefore, is implemented by scaling the number of memory communications execution engines (140).

In the NOC (102) of FIG. 3, each network interface controller (108) is enabled to convert communications instructions from command format to network packet format for transmission among the IP blocks (104) through routers (110). The communications instructions are formulated in command format by the IP block (104) or by the memory communications controller (106) and provided to the network interface controller (108) in command format. The command format is a native format that conforms to architectural register files of the IP block (104) and the memory communications controller (106). The network packet format is the format required for transmission through routers (110) of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In the NOC (102) of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. All memory-address-based communication that are executed with message traffic are passed from the memory communications controller to an associated network interface controller for conversion (136) from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller (106) is naturally also the network location of that memory communication controller's associated router (110), network interface controller (108), and IP block (104). The instruction conversion logic (136) within each network interface controller is capable of converting memory addresses to network addresses for purposes of transmitting memory-address-based communications through routers of a NOC.

Upon receiving message traffic from routers (110) of the network, each network interface controller (108) inspects each packet for memory instructions. Each packet containing a memory instruction is handed to the memory communications controller (106) associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In the NOC (102) of FIG. 3, each IP block (104) is enabled to bypass its memory communications controller (106) and send inter-IP block, network-addressed communications (146) directly to the network through the IP block's network interface controller (108). Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through it I/O functions (124) directly to the IP block's network interface controller in command format, then converted to packet format by the network interface controller and transmitted through routers of the NOC to another IP block. Such network-addressed communications (146) are bi-directional, potentially proceeding to and from each IP block of the NOC, depending on their use in any particular application. Each network interface controller, however, is enabled to both send and receive (142) such communications to and from an associated router, and each network interface controller is enabled to both send and receive (146) such communications directly to and from an associated IP block, bypassing an associated memory communications controller (106).

Each network interface controller (108) in the example of FIG. 3 is also enabled to implement virtual channels on the network, characterizing network packets by type.

Each network interface controller (108) includes virtual channel implementation logic (138) that classifies each communication instruction by type and records the type of instruction in a field of the network packet format before handing off the instruction in packet form to a router (110) for transmission on the NOC. Examples of communication instruction types include inter-IP block network-address-based messages, request messages, responses to request messages, invalidate messages directed to caches; memory load and store messages; and responses to memory load messages, and so on.

Each router (110) in the example of FIG. 3 includes routing logic (130), virtual channel control logic (132), and virtual channel buffers (134). The routing logic typically is implemented as a network of synchronous and asynchronous logic that implements a data communications protocol stack for data communication in the network formed by the routers (110), links (120), and bus wires among the routers. The routing logic (130) includes the functionality that readers of skill in the art might associate in off-chip networks with routing tables, routing tables in at least some embodiments being considered too slow and cumbersome for use in a NOC.

Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller (106) is naturally also the network location of that memory communication controller's associated router (110), network interface controller (108), and IP block (104). In inter-IP block, or network-address-based communications, therefore, it is also typical for application-level data processing to view network addresses as location of IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In the NOC (102) of FIG. 3, each router (110) implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router (110) in the example of FIG. 3 also includes virtual channel control logic (132) and virtual channel buffers (134). The virtual channel control logic (132) examines each received packet for its assigned communications type and places each packet in an outgoing virtual channel buffer for that communications type for transmission through a port to a neighboring router on the NOC.

Each virtual channel buffer (134) has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer (134) in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller (108). Each network interface controller is configured to, upon receipt of such a signal, refuse to accept, from its associated memory communications controller (106) or from its associated IP block (104), communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped in the architecture of FIG. 3. When a router encounters a situation in which a packet might be dropped in some unreliable protocol such as, for example, the Internet Protocol, the routers in the example of FIG. 3 suspend by their virtual channel buffers (134) and their virtual channel control logic (132) all transmissions of packets in a virtual channel until buffer space is again available, eliminating any need to drop packets. The NOC of FIG. 3, therefore, implements highly reliable network communications protocols with an extremely thin layer of hardware.

The example NOC of FIG. 3 is configured to maintain cache coherency with invalidate commands. As described above, either of the on-chip memories (114, 115) in the example of FIG. 2 may be implemented as an on-chip cache on a NOC according to embodiments of the present invention, and, within the scope of the present invention, cache memory can be implemented off-chip also. Each NOC can support multiple caches each which operates against the same underlying memory address space. Each such cache can contain the same segment of main memory at the same time, so that any change to that segment of memory in any of the caches leaves that same segment in the other caches invalid. Notifying the other caches that one of the caches has invalidated that segment or 'line' of memory in the other caches is 'maintaining cache coherency' as the term is used in this specification.

An invalidate command (506) is an instruction to a cache controller to invalidate a cache line. Each invalidate command include an identification (507) of a cache line to be invalidated, and, optionally, a mask (509) that identifies routers associated with caches. Caches may be controlled by IP blocks, by memory communications controllers, or by cache controllers external to the NOC to which the invalidate commands are delivered by network-address based communications. A cache is a collection of data duplicating original values stored elsewhere or computed earlier, where the original data is expensive to fetch, due to longer access time, or to compute, compared to the cost of reading or writing to the cache. That is, a cache is a temporary storage area where frequently accessed data can be stored for rapid access. Once the data is stored in the cache, future use can be made by accessing the cached copy rather than re-fetching or recomputing the original data, so that the average access time is shorter. A cache helps expedite data access that a processor would otherwise need to fetch from main memory. Again, either of the on-chip memories (114, 115) in the example of FIG. 2 may be implemented as an on-chip cache, and, within the scope of the present invention, cache memory can be implemented off-chip also.

A cache line is an entry in a cache. Cache lines may be of various sizes, 128 bytes, 256 bytes, 512 bytes, 1024 bytes, and so on. The size of a cache line typically is larger than the quantity of data typically requested by a memory access instruction, which typically ranges from about 1 to 16 bytes. Each cache entry or cache line also has an identifier, sometimes referred to as a 'tag,' which identifies the location from main memory whose contents are stored in a cache line. This identifier or 'tag' is used here as an identifier (507) of a cache line to be invalidated. Other identifiers are feasible, as will occur to those of skill in the art, but this identifier may be preferred in NOCs that maintain cache coherence according to embodiments of the present invention because it will uniquely identify a particular cache line to be invalidated across multiple caches even when that cache line is stored at different locations within each separate cache.

Each router in this example includes five ports, four ports (121A, 121B, 121C, 121D) connected through bus wires (120A, 120B, 120C, 120D) to other routers and a fifth port (123) connecting each router to its associated IP block (104) through a network interface controller (108) and a memory communications controller (106). As can be seen from the illustrations in FIGS. 2 and 3, the routers (110) and the links (120) of the NOC (102) form a mesh network with vertical and horizontal links connecting vertical and horizontal ports in each router. In the illustration of FIG. 3, for example, ports (121A, 123, 121C) are termed vertical ports, and ports (121B, 121D) are termed horizontal ports.

The example NOC of FIG. 3 configured to maintain cache coherency with invalidate commands includes a port (121A) on a router (110) of the network (102) through which is received an invalidate command (506). The router is configured to send the invalidate command to an IP block served by the router. The router is also configured to send the invalidate command horizontally and vertically to neighboring routers if the port through which the invalidate command is received is a vertical port and to send the invalidate command only horizontally to neighboring routers if the port through which the invalidate command is received is a horizontal port. In the NOC of FIG. 3, the routers (110) configured to send the invalidate command (506) to neighboring routers may also be configured to exclude sending the invalidate command back through the port through which the invalidate command was received—regardless whether the invalidate command is received through a vertical or a horizontal port. Because port (123) is classified as a vertical port, receiving an invalidate command through a vertical port includes both receiving an invalidate command from another router through ports (121A, 121D) and also receiving an invalidate command in a router from the router's adapted IP block through port (123).

Receiving an invalidate command from a router's adapted IP block through a port such as port (123) means that the IP block that is adapted to that router through a memory communications controller and a network interface controller is the IP block that initiated the invalidate command. Each NOC includes a memory communications controller (106) that adapts an IP block to a router, and each such memory communications controller is configured to store data to memory through a memory communications execution engine as described above. A memory communications execution engine for memory store instructions may be configured to send the invalidate command as part of the execution of a memory store instruction. Each such memory communications controller is also configured to send the invalidate command to a vertical port of its router through, for example, a port such as port (123) as part of the process of storing data in memory on the NOC.

In the NOC of FIG. 3, the invalidate command (506) may include a mask (509), that is, a data code specifying which IP blocks are to receive the invalidate command, and the router may be configured to transmit the invalidate command to an IP block served by the router, that is, to the IP block adapted to the router, by sending the invalidate command to that IP block only if the IP block is specified by a mask. When such a router receives an invalidate command that includes a mask that does not specify that router's IP block as an IP block to receive the invalidate command, the router sends the invalidate command on to neighboring routers without sending the invalidate command to its own IP block.

Figure 4:
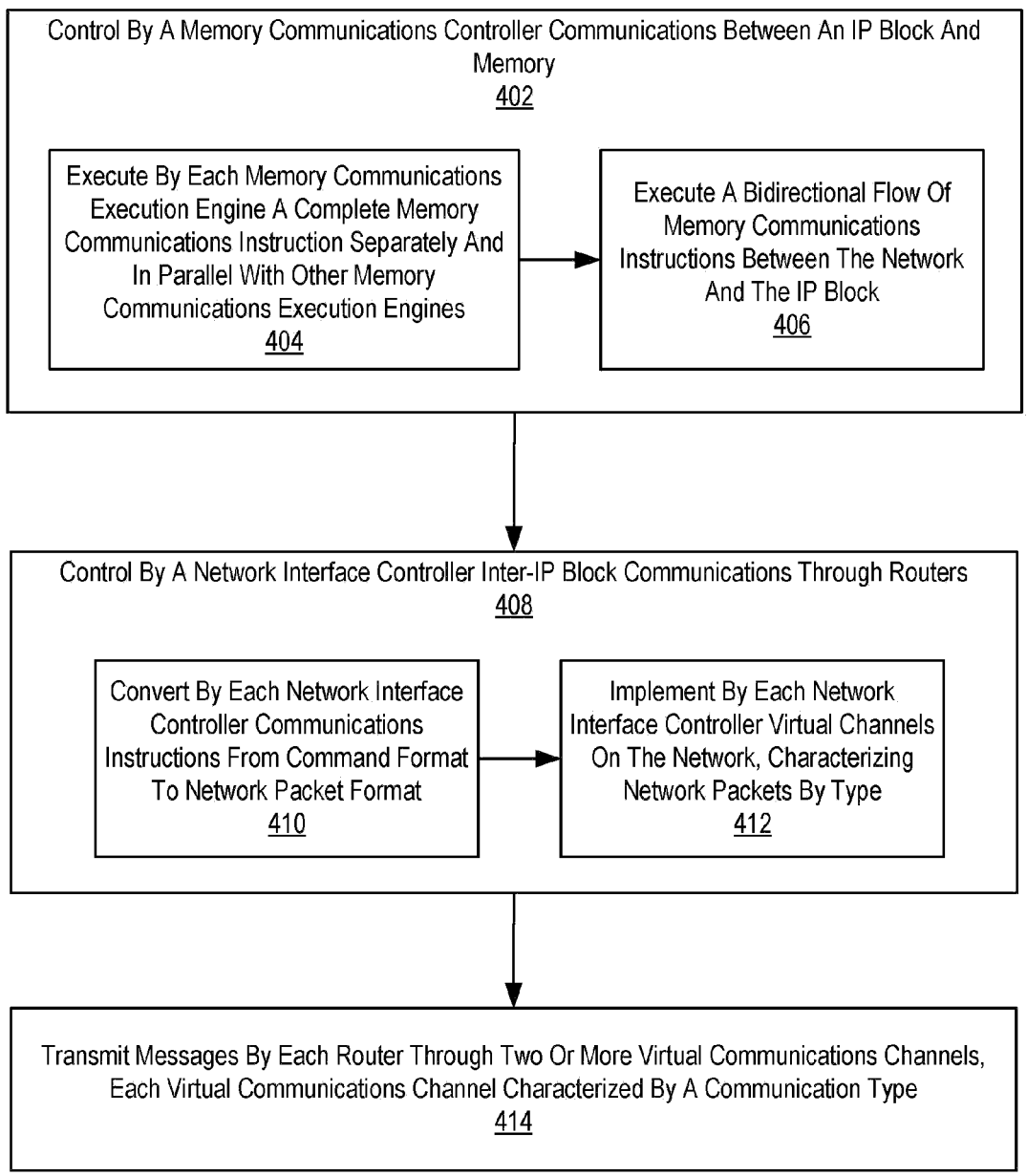
FIG. 4 sets forth a flow chart illustrating an exemplary method for data processing with a NOC according to embodiments of the present invention.

For further explanation, FIG. 4 sets forth a flow chart illustrating an exemplary method for data processing with a NOC according to embodiments of the present invention. The method of FIG. 4 is implemented on a NOC similar to the ones described above in this specification, a NOC (102 on FIG. 3) that is implemented on a chip (100 on FIG. 3) with IP blocks (104 on FIG. 3), routers (110 on FIG. 3), memory communications controllers (106 on FIG. 3), and network interface controllers (108 on FIG. 3). Each IP block (104 on FIG. 3) is adapted to a router (110 on FIG. 3) through a memory communications controller (106 on FIG. 3) and a network interface controller (108 on FIG. 3). In the method of FIG. 4, each IP block may be implemented as a reusable unit of synchronous or asynchronous logic design used as a building block for data processing within the NOC.

The method of FIG. 4 includes controlling (402) by a memory communications controller (106 on FIG. 3) communications between an IP block and memory. In the method of FIG. 4, the memory communications controller includes a plurality of memory communications execution engines (140 on FIG. 3). Also in the method of FIG. 4, controlling (402) communications between an IP block and memory is carried out by executing (404) by each memory communications execution engine a complete memory communications instruction separately and in parallel with other memory communications execution engines and executing (406) a bidirectional flow of memory communications instructions between the network and the IP block. In the method of FIG. 4, memory communications instructions may include translation lookaside buffer control instructions, cache control instructions, barrier instructions, memory load instructions, and memory store instructions. In the method of FIG. 4, memory may include off-chip main RAM, memory connected directly to an IP block through a memory communications controller, on-chip memory enabled as an IP block, and on-chip caches.

The method of FIG. 4 also includes controlling (408) by a network interface controller (108 on FIG. 3) inter-IP block communications through routers. In the method of FIG. 4, controlling (408) inter-IP block communications also includes converting (410) by each network interface controller communications instructions from command format to network packet format and implementing (412) by each network interface controller virtual channels on the network, including characterizing network packets by type.

The method of FIG. 4 also includes transmitting (414) messages by each router (110 on FIG. 3) through two or more virtual communications channels, where each virtual communications channel is characterized by a communication type. Communication instruction types, and therefore virtual channel types, include, for example: inter-IP block network-address-based messages, request messages, responses to request messages, invalidate messages directed to caches; memory load and store messages; and responses to memory load messages, and so on. In support of virtual channels, each router also includes virtual channel control logic (132 on FIG. 3) and virtual channel buffers (134 on FIG. 3). The virtual channel control logic examines each received packet for its assigned communications type and places each packet in an outgoing virtual channel buffer for that communications type for transmission through a port to a neighboring router on the NOC.

Figure 5:
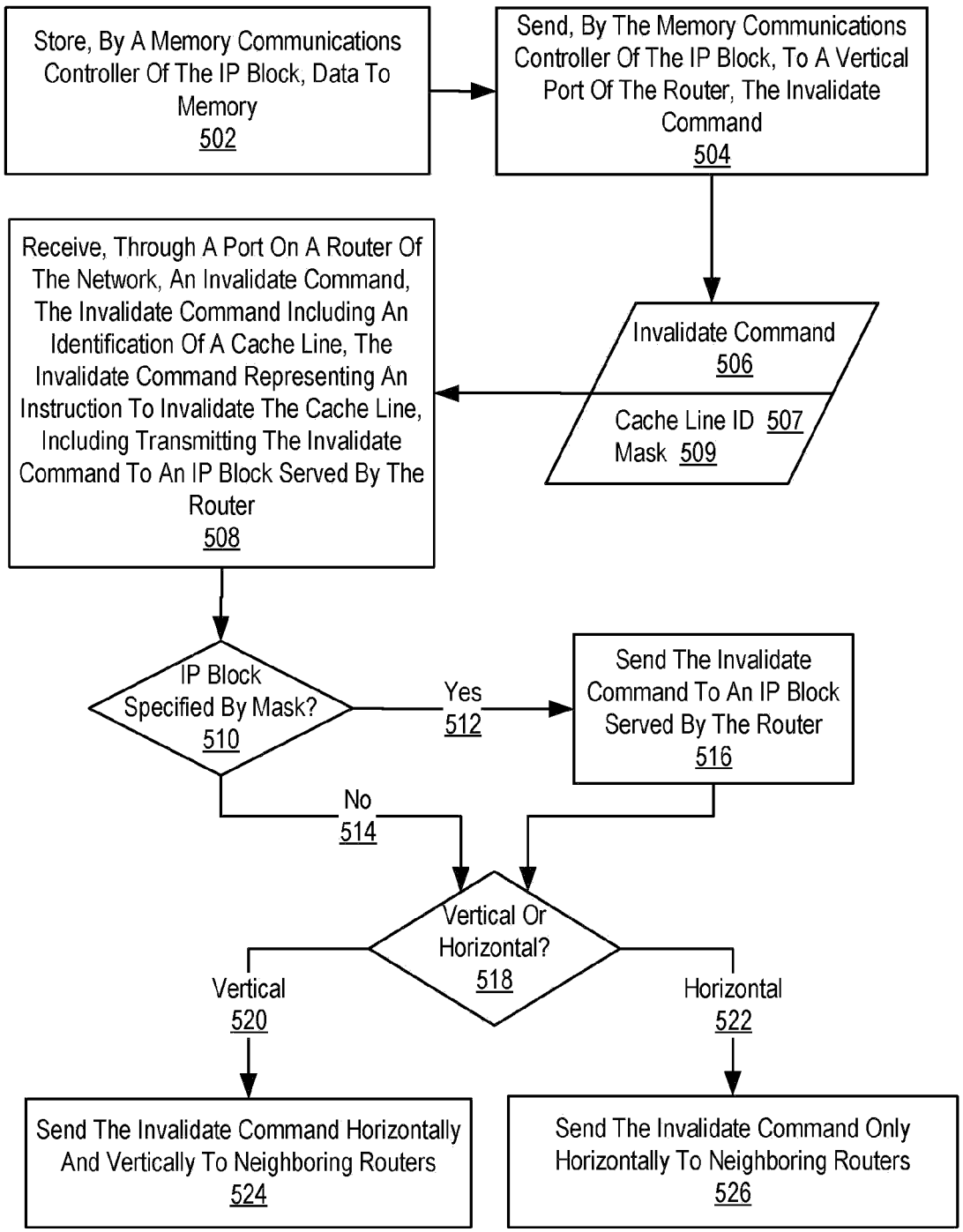
FIG. 5 sets forth a flow chart illustrating an exemplary invalidate method for maintaining cache coherency on NOC according to embodiments of the present invention.

For further explanation, FIG. 5 sets forth a flow chart illustrating an exemplary invalidate method for maintaining cache coherency on NOC according to embodiments of the present invention. The method of FIG. 5 is implemented on a NOC similar to the ones described above in this specification, a NOC (102 on FIG. 3) that is implemented on a chip (100 on FIG. 3) with IP blocks (104 on FIG. 3), routers (110 on FIG. 3), memory communications controllers (106 on FIG. 3), and network interface controllers (108 on FIG. 3). Each IP block (104 on FIG. 3) is adapted to a router (110 on FIG. 3) through a memory communications controller (106 on FIG. 3) and a network interface controller (108 on FIG. 3). In the method of FIG. 5, each IP block (104 on FIG. 3) may be implemented as a reusable unit of synchronous or asynchronous logic design used as a building block for data processing within the NOC.

The method of FIG. 5 includes storing (502), by a memory communications controller of the IP block, data to memory. When a processor (126) stores memory (128) implemented directly on the same IP block (104), it is possible that no memory communications instruction is issued from the IP block to the memory communications controller. From the point of view of any particular IP block, however, most or all of the computer memory of a NOC will be located physically across the network, accessed on or through other IP blocks. For all memory stores other than stores directly to memory on the same IP block, therefore, on NOCs according to embodiments of the present invention, a memory communications instruction will be processed by a memory communications controller (106) through a memory communication execution engine (140).

The method of FIG. 5 also includes sending (504), by the memory communications controller of the IP block, to a vertical port of the router, the invalidate command. It is possible that a processor (126) in an IP block of a NOC according to embodiments of the present invention may be implemented in effect as a superscalar processor with multiple hardware pipelines implemented with multiple hardware execution units for reading memory, storing memory, integer arithmetic, floating point math, and so on. In such a processor, a store execution unit may be configured with information indicating that in certain store instructions, or even in all store instructions, such an invalidate command is to be issued as part of the store operation because multiple caches are either possible or are actually implemented for support of memory operations on the NOC, either as part of the NOC or in association with the NOC. So configuring a processor's execution units with cache related processing duties, however, in some embodiments at least, may be considered to make a processor too heavyweight for a particular NOC design. On the other hand, all NOCs according to embodiments of the present invention contain memory communications controllers (106) that in turn contain memory communication execution engines (140) that are enabled as described above to execute a complete memory communications instruction separately and in parallel with other memory communications execution engines. It may therefore generally be preferred that an invalidate command be implemented as a component of a memory communications instruction that is executed entirely, including the sending of the invalidate command, by a memory communication execution engine (140) designed and dedicated to the execution of such a memory communications instruction.

The method of FIG. 5 also includes receiving (508), through a port on a router of the network, an invalidate command (506). The invalidate command includes an identification (507) of a cache line. The invalidate command represents an instruction to invalidate the identified cache line. In receiving the invalidate command, the router, as a default configuration, sends the invalidate command to the IP block served by the router, that is, to the IP block that is configured to the router by a memory communications controller and a network interface controller. The router sends the invalidate command to the IP block through the network interface controller that configures the router to the IP block. Because the invalidate command is a memory control command, the network interface controller passes the invalidate command to the memory communications controller. Any associated cache may be controlled directly by the memory communications controller (115 on FIG. 2) or by the IP block itself (114 on FIG. 2). If the memory communications controller controls an associated cache, the memory communications controller invalidates the identified cache line in response to receiving the invalidate command. If the IP block controls an associated cache, the memory communications controller invalidates the identified cache line in response to the receiving the invalidate command.

If there is no cache controlled by the memory communications controller or the IP block, the invalidate command is dropped or disregarded. Such an architecture, sending every invalidate command from a receiving router to its adapting memory communications controller and its IP block, places the intelligence for administering cache line invalidates in the memory communications controller and/or the IP block. In an alternative architecture, some of the intelligence for administering cache line invalidates can be shifted down into the routers. In such an architecture, the invalidate command (506) may include a mask (509) specifying which IP blocks are to receive the invalidate command. The mask (509) can be implemented as a digital code that specifies which IP blocks are to receive the invalidate command. Consider for further explanation an example of a NOC (102) having sixteen routers with sixteen adapted IP blocks, a NOC similar to the one illustrated in FIG. 2. A mask for such a NOC may be implemented as a sixteen-bit digital code, with one bit assigned to each IP block that is adapted to a particular one of the sixteen routers. In such a mask, a bit set to '0' may be used to indicate that the IP block identified by the bit controls no cache, and a bit set to '1' then would indicate that the IP block identified by the bit controls a cache. A router may be configured so that when the router receives (508, 510, 512) an invalidate command bearing such a mask, the router examines the mask to determine whether the IP block is specified by the mask (510) and sends (516) the invalidate command to its adapted IP block, the IP block served by the router, only if that IP block is specified by the mask (512), that is, in this example, only if the bit in the mask that corresponds to that IP block is set to '1'. If the invalidate command contains a mask that does not specify the IP block served by the router (514), the router routes the invalidate command further through the network, but does not send the invalidate command to the one IP block served by the router.

In addition to providing an invalidate command to its IP block as needed, a router operating in accordance with the method of FIG. 5, upon receiving an invalidate command through a port on the router, determines (518) whether the invalidate command was received on a horizontal or vertical port and also sends (524) the invalidate command (506) horizontally and vertically to neighboring routers if the port through which the invalidate command was received is a vertical port (520). If the port through which the invalidate command was received is a horizontal port (522), the router sends (526) the invalidate command only horizontally to neighboring routers. In typical embodiments, the router sends the invalidate command to neighboring routers without sending the invalidate command back through the port through which the invalidate command was received—both for invalidate commands received through vertical as well as horizontal ports.

Exemplary embodiments of the present invention are described largely in the context of a fully functional computer system for data processing with a NOC. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An invalidate method for maintaining cache coherency on a network on chip ('NOC'), the NOC comprising integrated processor ('IP') blocks, routers, memory communications controllers, and network interface controller, each IP block coupled to a router via a memory communications controller and the network interface controller, each memory communications controller controlling communication between an IP block and memory, and each network interface controller controlling inter-IP block communications through the routers, the method comprising:
   receiving, through a port on the router of a network, an invalidate command, the invalidate command including an identification of a cache line and a mask specifying which IP blocks are to receive the invalidate command, the invalidate command representing an instruction to invalidate the cache line, including sending the invalidate command to an IP block served by the router if the IP block is specified by the mask;
   if the port is a vertical port, sending the invalidate command horizontally and vertically to neighboring routers;
   if the port is a horizontal port, sending the invalidate command only horizontally to neighboring routers: and
   bypassing, by each IP block, the IP block's memory communications controller and sending, by each IP block, inter-IP block, network addressed communications directly to the network through the IP block's network interface controller.

2. The method of claim 1 further comprising:
   storing, by the memory communications controller of the IP block, data to the memory; and
   sending, by the memory communications controller of the IP block, to the router, the invalidate command.

3. The method of claim 1 wherein sending the invalidate command horizontally and vertically to neighboring routers excludes sending the invalidate command back through the port through which the invalidate command was received.

4. The method of claim 1 wherein sending the invalidate command only horizontally to neighboring routers excludes sending the invalidate command back through the port through which the invalidate command was received.

5. The method of claim 1 wherein the invalidate command comprises a component of a memory store instruction.

6. The method of claim 1 wherein each IP block comprises a reusable unit of synchronous or asynchronous logic design used as a building block for data processing within the NOC.

7. The method of claim 1 further comprising transmitting messages by each router through two or more virtual communications channels, each virtual communications channel characterized by a communication type.

8. The method of claim 1 further comprising:
sending by each IP block memory-address-based communications to and from memory through the IP block's memory communications controller and through the IP block's network interface controller to the network.

9. A network on chip ('NOC') that maintains cache coherency with invalidate commands, the NOC comprising integrated processor ('IP') blocks, routers, memory communications controllers, and network interface controller, each IP block coupled to a router via a memory communications controller and a network interface controller, each memory communications controller controlling communication between an IP block and memory, and each network interface controller controlling inter-IP block communications through the routers, the NOC further comprising:
a port on the router of a network through which is received an invalidate command, the invalidate command including an identification of a cache line and a mask specifying which IP blocks are to receive the invalidate command, the invalidate command representing an instruction to invalidate the cache line, the router configured to send the invalidate command to an IP block served by the router if the IP block is specified by the mask;
the router further configured to send the invalidate command horizontally and vertically to neighboring routers if the port is a vertical port;
the router further configured to send the invalidate command only horizontally to the neighboring routers if the port is a horizontal port; and
each IP block is enabled to bypass the IP block's memory communications controller and send inter-IP block, network-addressed communications directly to the network through the IP block's network interface controller.

10. The NOC of claim 9 further comprising:
the memory communications controller of the IP block configured to store data to the memory; and
the memory communications controller of the IP block further configured to send the invalidate command to the router.

11. The NOC of claim 9 wherein the router configured to send the invalidate command horizontally and vertically to neighboring routers excludes sending the invalidate command back through the port through which the invalidate command was received.

12. The NOC of claim 9 wherein the router configured to send the invalidate command only horizontally to neighboring routers excludes sending the invalidate command back through the port through which the invalidate command was received.

13. The NOC of claim 9 wherein the invalidate command comprises a component of a memory store instruction.

14. The NOC of claim 9 wherein each IP block comprises a reusable unit of synchronous or asynchronous logic design used as a building block for data processing within the NOC.

15. The NOC of claim 9 wherein each router comprises two or more virtual communications channels, each virtual communications channel characterized by a communication type.

16. The NOC of claim 9 wherein each network interface controller is enabled to:
convert communications instructions from command format to network packet format; and
implement virtual channels on the network, characterizing network packets by type.

* * * * *